Figure 1:
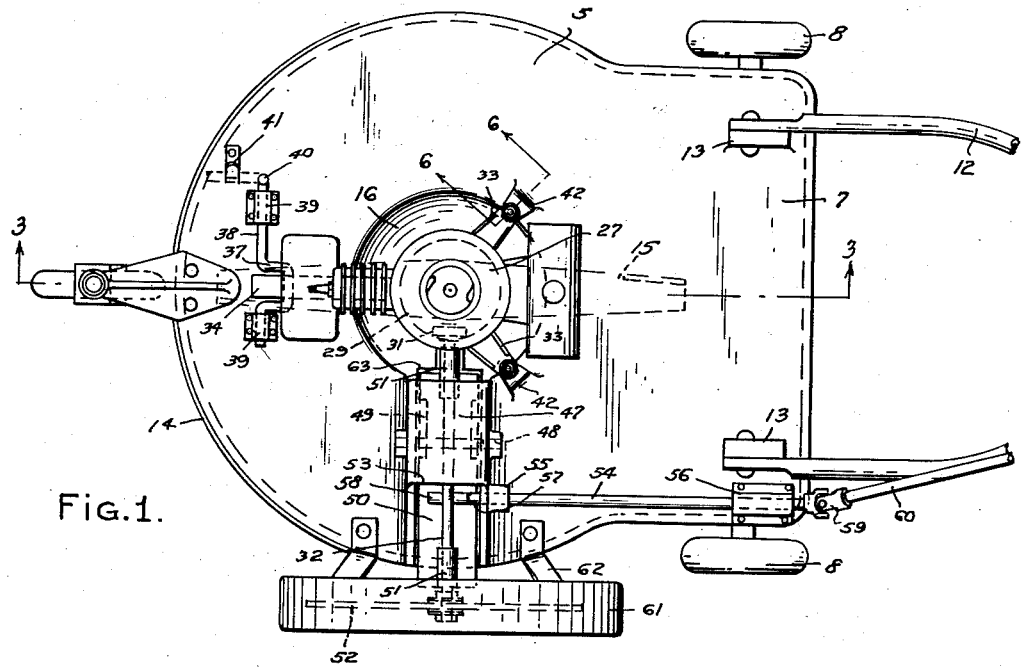

May 10, 1955

L. R. NORTON ET AL 2,707,858

COMBINED LAWN MOWER AND EDGER

Filed Feb. 16, 1953

2 Sheets-Sheet 1

INVENTORS
LUTHER R. NORTON
BY HARRY KATZEN,

ATTORNEY.

May 10, 1955

L. R. NORTON ET AL 2,707,858

COMBINED LAWN MOWER AND EDGER

Filed Feb. 16, 1953

2 Sheets-Sheet 2

INVENTORS
LUTHER R. NORTON
BY HARRY KATZEN,

ATTORNEY.

United States Patent Office 2,707,858
Patented May 10, 1955

2,707,858

COMBINED LAWN MOWER AND EDGER

Luther R. Norton and Harry Katzen, Miami Beach, Fla.

Application February 16, 1953, Serial No. 336,974

6 Claims. (Cl. 56—25.4)

This invention relates to improvements in grass cutting machines and has particular reference to a novel form of machine that functions as a combined lawn mover and edger.

It is an object of the present invention to provide a grass cutting machine that embodies a rotary horizontal cutting blade and a vertical rotary edging blade, each being independently driven from a common prime mover in a manner whereby either or both of the blades may be immobilized until such time as they are to be brought into use for their respective purposes.

The invention contemplates a novel drive connection between the prime mover and the horizontal cutting blade and novel drive means between the prime mover and the vertical cutting blade, with the vertical cutting blade and associated elements being shiftable from a cutting position to an inoperative out-of-the-way non-cutting position calculated to permit the operation of the machine as a lawn mower without possible interference of the edging blade.

Various novel structural details and arrangement of parts will be more clearly understood by reference to the accompanying drawings, wherein has been illustrated a preferred form of the device and wherein like characters of reference are employed to denote like parts throughout.

Figure 2:
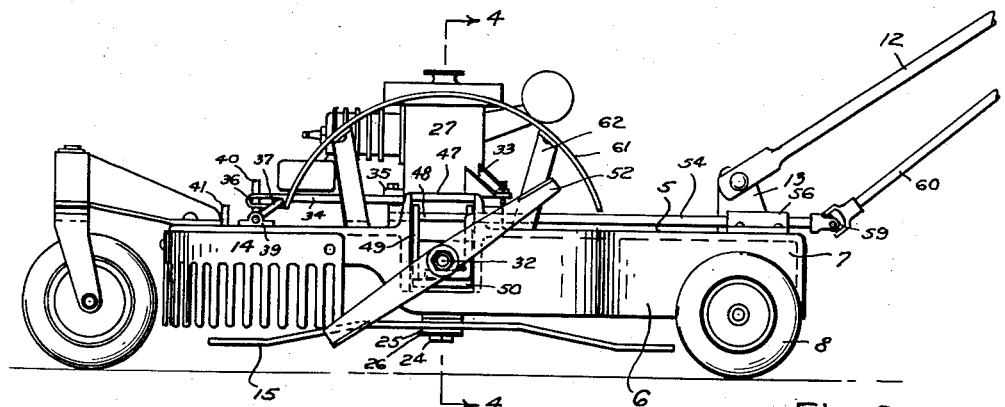
Figure 5:
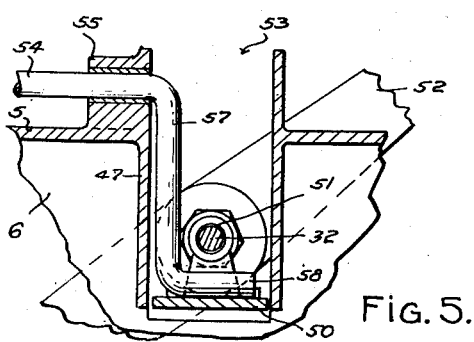
Figure 3:
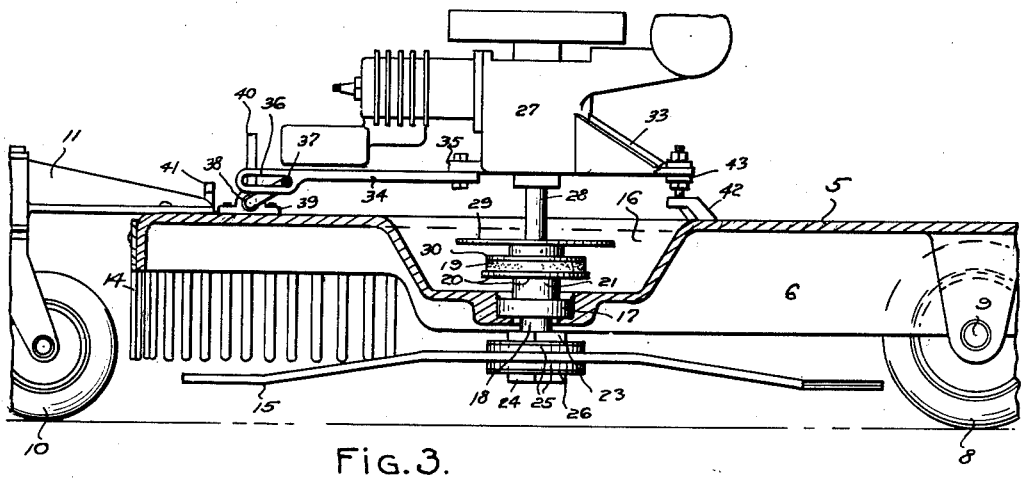
Figure 4:
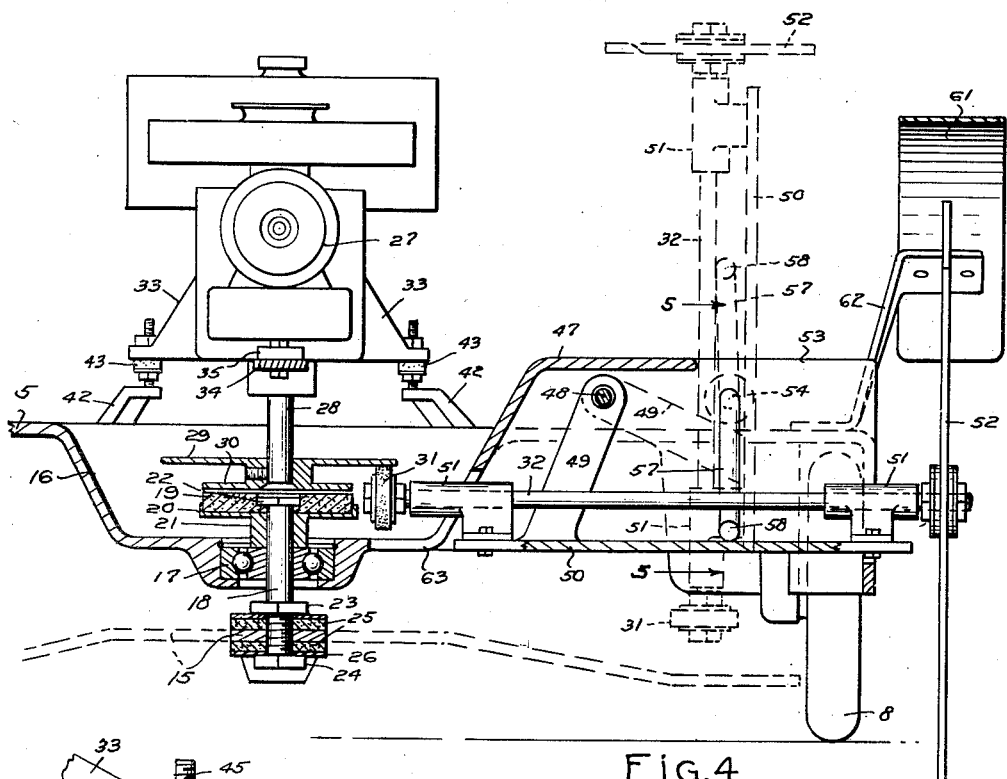
Figure 6:
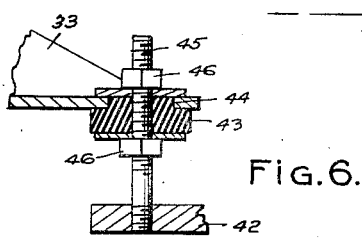

In the drawings:

Figure 1 is a plan view of a machine constructed in accordance with the invention, Figure 2 is a side elevation thereof, Figure 3 is a fragmentary vertical longitudinal section taken substantially on line 3—3 of Figure 1 with parts in elevation, Figure 4 is a slightly enlarged fragmentary transverse vertical section taken substantially on line 4—4 of Figure 2, Figure 5 is an enlarged fragmentary vertical section taken substantially on line 5—5 of Figure 4 and, Figure 6 is a fragmentary vertical section taken on line 6—6 of Figure 1, illustrating a novel form of cushioned mounting support for the prime mover.

Referring specifically to the drawings, the numeral 5 designates a platform of any desirable material but here illustrated as being in the nature of a metallic casting having a flat upper surface and a circumferential skirt portion 6. The platform, see particularly Figure 1, is formed in a generally circular shape and having a rear extension 7. The platform is supported upon opposite sides of the extension 7 by ground wheels 8, rotatable upon suitable stub-shafts 9. The front portion of the platform is supported upon a conventional caster wheel 10, carried by a rigid bracket 11. The wheels 8 and 10 support the platform in spaced relation to the lawn to facilitate the travel thereof freely in any direction under the influence of a handle 12, shown fragmentarily in Figures 1 and 2. The handle 12 is connected with the platform in any desirable manner as by brackets 13, preferably formed integrally with the platform. The skirt 6 is shortened around the forward part of the machine, as shown in Figure 3, and a guard 14 is fixed to the forward part of the platform for permitting the device to override the grass and to permit the grass to enter beneath the platform to be engaged and cut by a rotary horizontal cutting blade 15, to be more clearly described. Centrally and concentric to the platform 5 is a depression or well 16 having a predetermined depth and forming in effect a well for the housing of clutch means, to be described. The well 16 is centrally apertured and centrally counterbored for the reception of an anti-friction bearing 17 of conventional form.

Rotatably supported in the bearing 17 is a vertically disposed shaft section 18, carrying at its upper end a friction disc 19 that is fixed within a cupped support 20. The support 20 is provided with a hub section 21 that is carried upon the upper end of the shaft 18 and held against displacement by a nut 22. The hub 21 has a thrust engagement upon the inner raceway of the bearing 17 to limit the downward movement of the shaft 18. The shaft 18 extends below the bearing 17 and its lower end is threaded for the clamping support of the cutting blade 15. The blade 15 is held upon the lower end of the shaft 18 by nuts 23 and 24 and, disposed between the nuts and the blade 15, are preferably fiber washers 25 and metallic washers 26. The blade 15 is angled intermediate its ends with the opposite ends disposed in a horizontal plane and oppositely sharpened in the direction of rotation of the blade in use. The numeral 27 indicates a prime mover of conventional construction, here shown as being an internal combustion engine. The engine 27 has a drive shaft 28 that is vertically disposed and axially arranged with respect to the shaft 18. Fixed upon the lower end of the shaft 28 is a pair of clutch discs 29 and 30 that are concentric with the friction disc 19. The disc 29 is formed relatively large in diameter for frictional driving connection with a friction wheel 31 fixed upon a driven shaft 32 of an edging assembly, to be described. The disc 30 is shiftable in a substantially vertical plane toward and from the friction disc 19 and serves as a driving connection for the shafts when the discs 30 and 19 are in contact with each other. The engine 27 is supported partially upon a pair of radial legs 33 and an elevating bar 34 that projects forwardly from a bracket 35 carried by the engine. The forward or free end of the bar 34 is slotted at 36 to be engaged by an offset crank 37 carried by a shaft 38 that is journalled in bearings 39 fixed upon the platform 5. The shaft 38 is provided with a right angularly disposed handcrank 40 which serves as a means to manually rock the shaft 38 to cause the crank 37 to shift within the slot 36 as a means to elevate or rock the motor upwardly to disengage the disc 30 from the disc 19, thus providing for a relatively simple clutch drive for the cutting blade 15. A preferably spring detent 41 serves to hold the crank 40 in a position to maintain the clutch in disengaged position at such times as the operator is starting the motor, or at such times as the mower is being transferred to the area to be cut. The legs 33 have a resilient mounting upon rigid brackets 42, preferably integrally with the platform 5 and disposed in a position to underlie the ends of the legs 33. The flexible or cushioned mounting support for the legs 33 consists of a preferably rubber grommet 43 that has a reduced extension engaging within an aperture 44 of the legs 33. A fixed vertically disposed threaded rod 45 has fixed connection with the bracket arms 42. The legs 33 and the grommets 43 are vertically shiftable upon the rods 45 under the influence of adjusting nuts 46, through the medium of which the motor may be bodily adjusted vertically to assure of an even and full contacting engagement between the disc 30 and the disc 19 when the engine 27 is lowered to the clutched driving position under the influence of the crank 37. It will thus be seen that when the crank 37 is shifted to elevate or rock the motor upwardly, the clutch is disengaged and the cutting blade 15 remains idle. The grommet 43 permits of this rocking motion due to the resiliency thereof.

Transversely of the platform 5 and to one side of the well 16, the casting is provided with an upstanding housing 47, open at the bottom. Pivotally supported within the housing 47, as upon a shaft 48, is a pair of parallel and angularly disposed supporting arms 49, preferably formed integrally with a base plate 50 that is included within a shiftable edging assembly. Fixedly supported upon the plate 50 at opposite ends, are bearings 51 that rotatably support the shaft 32. The shaft 32 projects beyond the outer bearing 51 and beyond the side of the platform with its terminal end threaded for clamping support of a double end edging blade 52. The blade 52 is fixed upon the end of the shaft 32 to be rotatable in a vertical plane for an edging operation upon the lawn, such as along sidewalks, curbing or flower borders. The blade 52 is disposed a distance outwardly beyond the platform sufficient to permit the ground wheels 8 to ride upon the surface of the lawn to be edged or along the surface of the sidewalk. The blade 52 has a length calculated to cut a substantial depth below the surface of the sidewalk, etc. As clearly shown in Figure 4, the edging assembly is in the position for driving connection with the disc 29 through the medium of the contacting engagement of the friction wheel 31, in which position the shaft 32 and plate 50 are in substantially a horizontal position. Since, as before stated, it is contemplated that the edging assembly shall be shifted to an inoperative position when the device is used as a lawn mower and, to provide for this shifting movement, the housing 47 is cut away at 53 to permit the edging assembly to be swung upon the shaft 48 from a horizontal to a vertical position, clearly shown in dotted lines in Figure 4, the depth of the cut 53 being such as to dispose the edging assembly in such vertical position at its maximum point of shifting. The means employed to shift the assembly to the vertical position embodies a rock shaft 54 that is journalled in bearings 55 and 56. One end of the shaft 54 extends into the housing 47 and is shaped to form a crank 57 having a lower horizontally arranged leg 58 that has alternate bearing engagement upon the plate 50 when the assembly is shifted to the operative position and bearing engagement with the shaft 32 when the assembly is shifted to the vertical position. The opposite end of the shaft 54 is provided with a universal coupling 59 driven from a shaft 60 that extends in any desirable manner to a point adjacent a hand portion of the handle 12, not shown. Any suitable means may be employed to lock the shaft 60 in either position of adjustment of the edging assembly and the arrangement shown is one means for the convenient manipulation of the edging assembly. A suitable arcuate guard 61 is supported from the platform by brackets 62 to overlie the edging blade 52 as a protective medium, with the guard being sufficiently elevated to permit the uninterrupted shifting of the edging assembly. To permit the edging assembly to be shifted to the vertical or inoperative position, the well 16 has been cut away at 63 to permit the bearing 51 and the adjacent friction wheel 31 passing therethrough.

In the use of the device, the operator actuates the crank 37 to rock the engine 27 upwardly to simultaneously elevate the discs 29 and 30 for disengaging the clutched connection between the disc 30 and friction disc 19. It is assumed that the edging assembly has been shifted to the dotted line position of Figure 4. The operator is now permitted to start the motor in the usual manner free from driving connection with either of the cutting blades 15 and 52. Assuming now that the engine has been started and that it is desired to employ the device as a lawn mower, using the horizontal blade 15, the edging assembly remains in the inoperative or vertical position. The operator then proceeds to reverse the action of the crank 37, permitting the motor to rock downwardly by gravity for bringing the discs 30 and 19 into clutched engagement, thus establishing the drive to the cutter 15. The mower is manually propelled in the usual and well-known manner by the handle 12. It may be found desirable in some forms of the device to include a power drive from the shaft 28 to the ground wheels 8. However, this drive has not been included since it forms no part of the present invention. After the lawn has been cut in the usual manner, it now becomes necessary to edge along sidewalks, etc., and, to accomplish this, the operator again shifts the crank 37 to disengage the clutch connection to the blade 15, after which the shaft 60 is actuated to drive the shaft 54 and its crank 57 to bodily swing the edging assembly downwardly to the full line position shown in Figure 4 with the friction wheel 31 engaging the underside of the disc 29. In this position the crank 57 is in substantially a vertical position and securely maintains the platform 50 against upward swinging motion. The crank 37 is then actuated in a reverse direction to permit the motor to rock downwardly by gravity to establish a full contacting engagement of the disc 29 with the friction wheel 31 and, in this position, the disc 30 and disc 19 are in slightly separated position, thus establishing a drive to the shaft 32 and its associated cutter blade 52, while the blade 15 and its associated shaft 18 remains idle. The operator then proceeds to employ the machine as an edger in the usual and well-known manner. The crank 57 positively prevents any tendency of the platform 50 and its associated elements from rocking upwardly under the influence of the weight of the engine 27.

It will thus be apparent that a very novel and effective device has been provided in a single machine for both the lawn cutting and edging. The parts are few and simple, are strong, durable, cheap to manufacture and are of such nature as requires relatively little attention. The adjustments are simple and effective and either of the blades 15 or 52 may be brought into operative use with a minimum of effort. The device readily adapts itself to various conventional internal combustion engines or a prime mover of the electrically driven type. The edging assembly when in the vertical or inoperative position is out of the way and offers no impediment to the freely shiftable action of the mower when the blade 15 is in operation.

It is to be understood that while a preferred form of the device has been shown and described, it should be understood that various structural changes are contemplated as readily fall within the spirit of the invention or the scope of the subjoined claims.

Having described our invention, what we claim as new and desire to secure by Letters Patent is:

1. A dual bladed grass cutting machine of the character described that functions as a lawn mower and an edger and which includes a mobile platform having ground wheels and a propelling handle, a prime mover supported upon the platform to be shifted in a vertical plane, clutch means actuable by the shifting of the prime mover for alternately driving a mower blade, that is rotatably supported beneath the platform to rotate in a horizontal plane as a lawn mower, an edging blade that has a drive shaft supported within the platform with the blade arranged outwardly of one side of the platform to rotate in a vertical plane, alternate drive means between the shaft and the clutch means of the prime mover, the edging blade and its drive shaft being supported in the platform to be swingable in a vertical arc to an inactive and a non-grass cutting position with the blade overlying the platform.

2. The device as in claim 1, wherein the prime mover is provided with radial supporting legs having a cushioned mounting upon the platform and a crank means supported upon the platform to elevate and lower the prime mover on its legs to shift the clutch discs toward and from their driving connections with the blades, the crank means in one position maintaining the prime mover in an elevated position to immobilize both of the blades.

3. A dual bladed grass cutting machine of the character described that serves the combined functions of a lawn mower and an edger, the combination with a mobile platform having ground wheels and a handle to propel the platform over a lawn, the platform provided with a centrally arranged well, a prime mover supported on the platform above and centrally of the well, the prime mover having a vertically disposed depending drive shaft that extends into the well, a pair of clutch discs fixed upon the lower end of the shaft, the well having a bottom that is recessed to support an antifriction bearing, a shaft section journalled in the bearing and projecting above and below the bearing with the lower end of the shaft section projecting below the bottom of the well and adapted to support a horizontally rotatable mower blade, the shaft section being axially aligned with the shaft of the prime mover, a friction disc carried by the upper end of the shaft section to be alternately engaged by one of the clutch discs, an edging device that includes a driven shaft that is rotatably supported upon a base plate, the driven shaft at one end projecting beyond one side of the platform and having fixed thereto a cutting blade that rotates in a vertical plane to edge the lawn, the driven shaft at its opposite end provided with a friction drive connection with one of the clutch discs, the driven shaft, its supporting plate, cutter blade and friction drive connection being pivotally supported in the platform to be swung in a vertical arc to a non-grass cutting position with the cutter blade being disposed in overlying relation to the platform, the prime mover being vertically shiftable to shift the clutch discs toward and from their contacting drive connections with either of the blades for alternately driving either blade, the prime mover when in a maximum elevated position immobilizing both of the blades.

4. The device as recited in claim 3, wherein the clutch discs embody a lower relatively small disc and an upper relatively large disc, the lower disc having a friction drive engagement with the friction disc of the shaft section when the prime mover is bodily shifted downwardly, the swinging of the shaft for the edging blade downwardly disposing its friction drive means in underlying frictional contact with the large clutch disc, the shifting of the edging blade and its shaft to a grass cutting position establishing a drive to its shaft and elevating the clutch discs to the point where the small clutch disc and its adjacent friction disc are disconnected and means for swinging the edging blade and its associated elements to the operative or inoperative position, the said swinging means retaining the edging blade and associated elements in either position of adjustment.

5. The device as recited in claim 4, wherein the friction drive connection for the driven shaft of the edging blade comprises a friction wheel fast on the shaft and shiftable toward and from the large clutch disc under the swinging motion of the driven shaft and associated elements, the supporting plate provided with journal bearings for the rotatable support of the driven shaft, a pair of parallel arms carried by the supporting plate that have pivotal support with the platform, a rock-shaft supported on the platform that is provided with a crank having one end that contacts the supporting plate to swing the plate and the associated edging blade and driven shaft downwardly to operative driven position, the crank serving to retain the plate and associated elements in the driven position against shifting, the said crank serving to shift the plate and associated elements upwardly by contacting engagement with the driven shaft to dispose the plate and associated elements in an inoperative position with the edging blade disposed above and overlying the platform, the rock-shaft being driven from a remote point.

6. A grass cutting and edging machine of the character described that comprises a mobile platform that is circular in top plan and provided with a centrally arranged well, the platform having a pair of rear ground wheels and a forward caster wheel, the well being centrally apertured and counterbored for the reception of an anti-friction bearing, a shaft section journalled in the bearing in a vertical manner to project above and below the bearing, a friction disc fixed upon the upper end of the shaft section, the shaft section adapted to support a rotary cutting blade at its lower end, a prime mover supported on the platform to be shiftable in a vertical plane, radial legs carried by the prime mover that have flexible and adjustable support in rigid brackets carried by the platform, a rigid slotted arm carried by the prime mover, a shaft rockably supported on the platform that is provided with an offset crank that engages the slotted arm to rock the prime mover in a vertical plane on its flexible supports, the prime mover being disposed over the well centrally thereof and provided with a depending vertically disposed drive shaft that is axially aligned with the shaft section, a pair of parallel clutch discs fixed upon the lower end of the prime mover shaft to be movable toward and from the friction disc under the influence of the vertical shifting of the prime mover, one of the clutch discs being relatively wide and extending beyond its companion disc, the smaller clutch disc establishing a friction drive connection with the friction disc when the prime mover is shifted downwardly by the crank, an edging assembly that includes a supporting plate having aligned journal bearings thereon, a shaft rotatable in the bearings and extending transversely of the platform to project outwardly beyond one side of the platform for the support of a double end edging blade that rotates in a vertical edging plane, the last named shaft at its opposite end provided with a friction wheel that has underlying contacting engagement with the larger clutch disc when the edging blade is in operative cutting position, parallel arms carried by the plate for the pivotal support of the plate and its associated bearings, shaft and cutting blade whereby the assembly may be swung in a vertical arc to a non-grass cutting position with the blade disposed above and overlying the platform, a rock-shaft supported on the platform that is provided with a crank arm that engages the upper surface of the plate to swing the assembly downwardly to operative position for contacting engagement of the friction wheel with the large clutch disc, the crank arm also serving to swing the assembly upwardly to inoperative position, the edging assembly when in the operative position maintaining the smaller clutch disc and its associated friction disc separated, the prime mover when shifted to its maximum upper position serving to disconnect the clutch drive.

References Cited in the file of this patent

UNITED STATES PATENTS

| | | |
|---|---|---|
| 2,480,922 | Harshman | Sept. 6, 1949 |
| 2,618,919 | Hutchens | Nov. 25, 1952 |